US011111882B2

(12) United States Patent
Maeding et al.

(10) Patent No.: US 11,111,882 B2
(45) Date of Patent: Sep. 7, 2021

(54) INJECTION APPARATUS FOR A ROCKET ENGINE

(71) Applicant: Airbus DS GmbH, Taufkirchen (DE)

(72) Inventors: Chris Udo Maeding, Unterschleissheim (DE); Axel Preuss, Kochel am See (DE); Jan Alting, Hoehenkirchen-Siegertsbrunn (DE)

(73) Assignee: ARIANEGROUP GMBH, Taufkirchen (DE)

( * ) Notice: Subject to any disclaimer, the term of this patent is extended or adjusted under 35 U.S.C. 154(b) by 560 days.

(21) Appl. No.: 15/609,104

(22) Filed: May 31, 2017

(65) Prior Publication Data
US 2017/0350349 A1 Dec. 7, 2017

(30) Foreign Application Priority Data

Jun. 2, 2016 (DE) .......................... 102016209650.8

(51) Int. Cl.
 *F02K 9/52* (2006.01)
 *F02K 9/62* (2006.01)
(52) U.S. Cl.
 CPC . *F02K 9/52* (2013.01); *F02K 9/62* (2013.01)
(58) Field of Classification Search
 CPC ................ F02K 9/52; F02K 9/60; F02K 9/62
 See application file for complete search history.

(56) References Cited

U.S. PATENT DOCUMENTS

| 3,200,589 | A |   | 8/1965  | Mower et al. |              |
|-----------|---|---|---------|--------------|--------------|
| 3,342,668 | A |   | 9/1967  | Dario        |              |
| 5,172,548 | A | * | 12/1992 | Dubedout     | F02K 9/52    |
|           |   |   |         |              | 60/258       |
| 5,456,065 | A | * | 10/1995 | Dargies      | F02K 9/52    |
|           |   |   |         |              | 239/403      |

(Continued)

FOREIGN PATENT DOCUMENTS

| DE | 102004018725 | 11/2005 |
|----|--------------|---------|
| EP | 1780395      | 5/2007  |

(Continued)

OTHER PUBLICATIONS

German Search Report, dated Feb. 6, 2017, priority document.

*Primary Examiner* — Todd E Manahan
*Assistant Examiner* — Thuyhang N Nguyen
(74) *Attorney, Agent, or Firm* — Greer, Burns & Crain, Ltd.

(57) ABSTRACT

An injection apparatus for a rocket engine comprises an injection plate which delimits a combustion chamber upstream. The injection apparatus further comprises a plurality of coaxial injection elements distributed in the injection plate, each of which injection elements forms an inner outlet opening, delimited by a central sleeve body, for a first propellant component and an outer outlet opening for a second propellant component. The outer outlet opening is formed between the central sleeve body and a wall section which surrounds the central sleeve body in an annular manner. At least in a partial number of the injection ele- (Continued)

ments, the central sleeve body projects from the wall section in the direction towards the combustion chamber. In particular, the central sleeve body projects relative to the injection plate into the combustion chamber.

3 Claims, 4 Drawing Sheets

(56) References Cited

U.S. PATENT DOCUMENTS

| | | | | |
|---|---|---|---|---|
| 6,244,041 | B1* | 6/2001 | Vasin | F02K 9/52 |
| | | | | 60/258 |
| 8,122,703 | B2* | 2/2012 | Fisher | F02K 9/95 |
| | | | | 60/258 |
| 2005/0097883 | A1 | 5/2005 | Ryu et al. | |
| 2008/0245072 | A1 | 10/2008 | Maeding | |
| 2008/0302335 | A1* | 12/2008 | Fang | F23D 14/24 |
| | | | | 123/468 |

FOREIGN PATENT DOCUMENTS

| | | | |
|---|---|---|---|
| JP | 2008-111340 A | | 5/2008 |
| JP | 2008111340 A | * | 5/2008 |

* cited by examiner

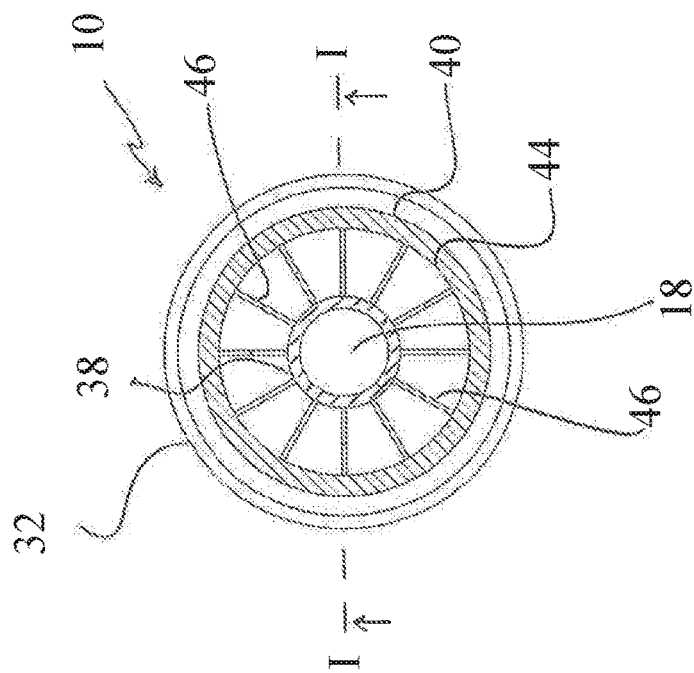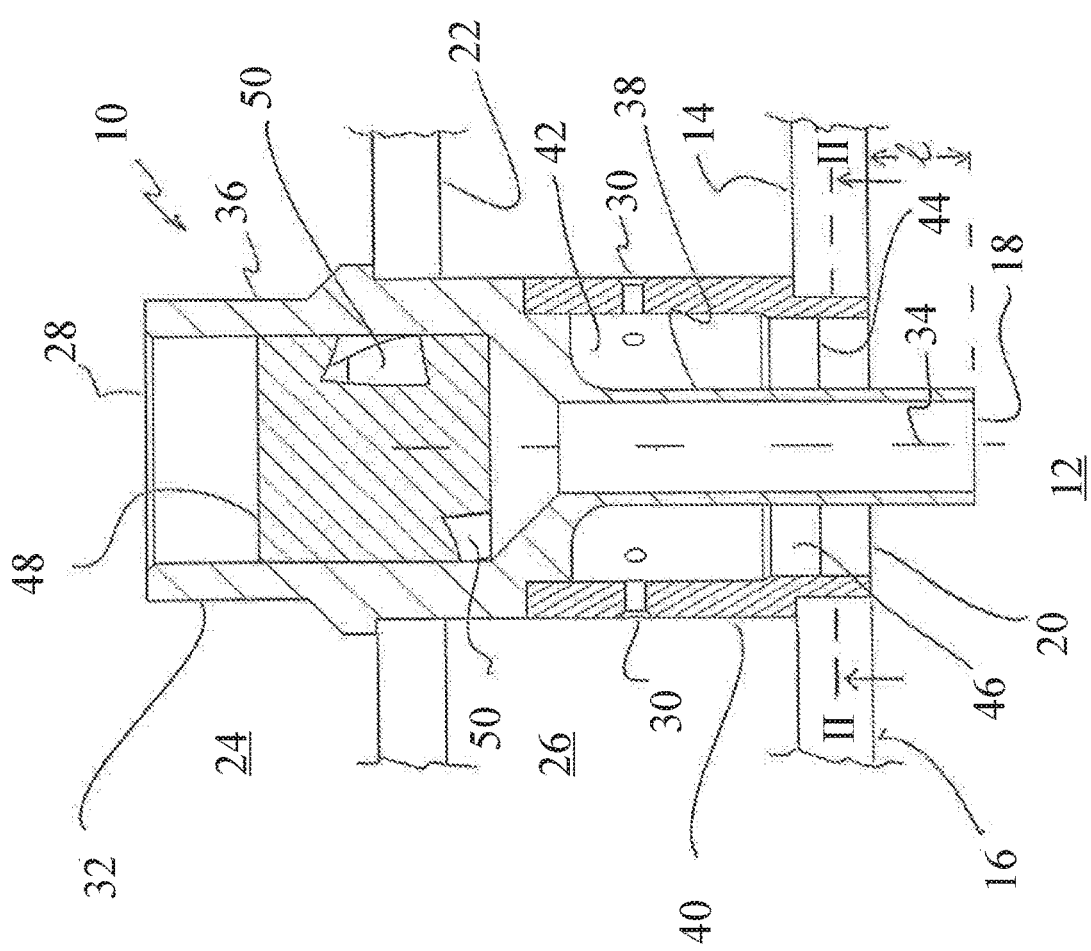

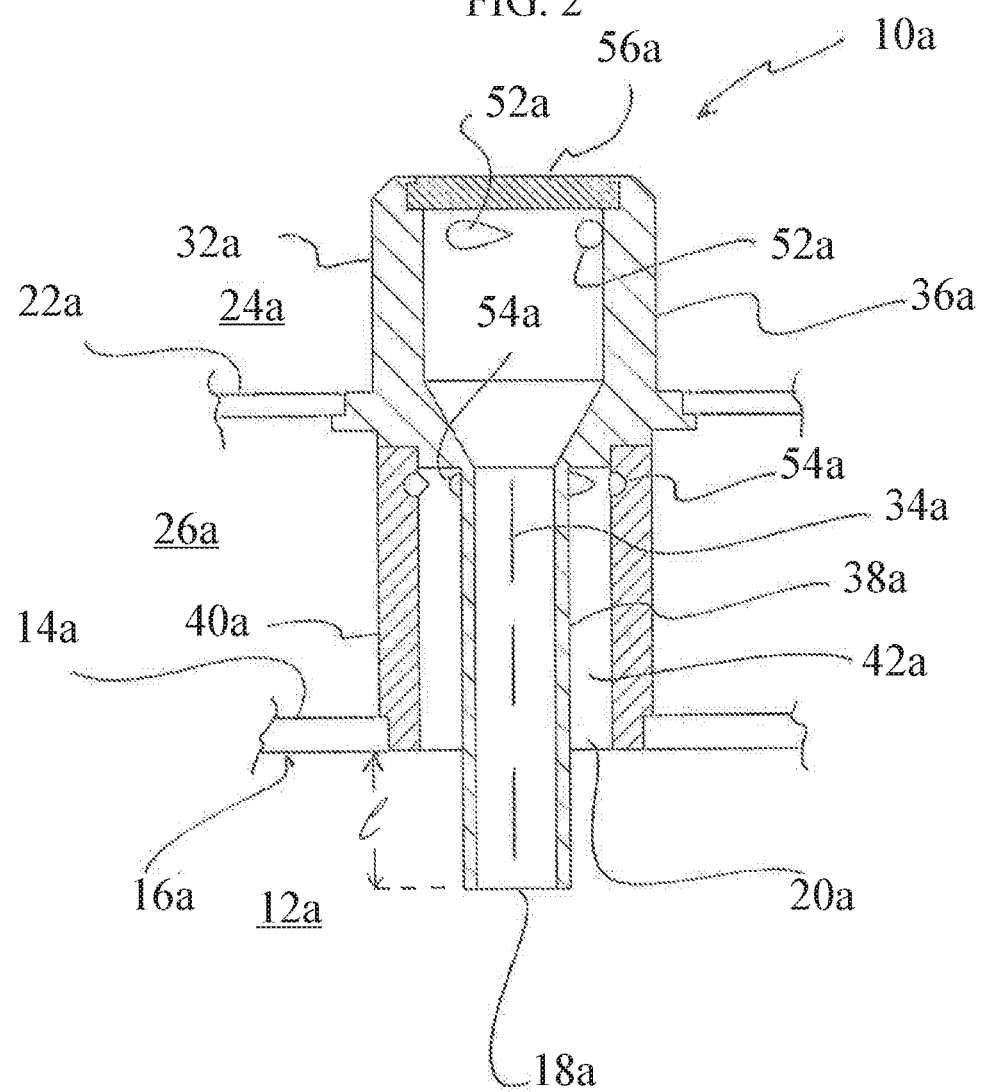

INJECTION APPARATUS FOR A ROCKET ENGINE

CROSS-REFERENCES TO RELATED APPLICATIONS

This application claims the benefit of the German patent application No. 10 2016 209 650.8 filed on Jun. 2, 2016, the entire disclosures of which are incorporated herein by way of reference.

BACKGROUND OF THE INVENTION

The invention relates to an injection apparatus for a rocket engine.

A conventional injection apparatus for a rocket engine comprises an injection head which delimits upstream a combustion chamber of the engine and has an injection plate in which a plurality of injection elements are arranged. A conventional configuration for the injection elements is a coaxial configuration, in which a first propellant component (e.g., an oxidant) is ejected from the injection element in question into the combustion chamber through a central (inner) outlet opening. A second propellant component (e.g., a fuel) is ejected through an outer outlet opening which extends in an annular manner around the central outlet opening and is arranged coaxially therewith. With such a coaxial configuration, the first propellant component can be injected into the combustion chamber in the form of a central jet and the second propellant component can be injected into the combustion chamber in the form of an annular jet surrounding the central jet, for example. For the prior art relating to such injection elements of coaxial configuration, reference may be made, for example, to EP 1 780 395 A1 and U.S. Pat. No. 6,244,041 B1.

Depending on the construction of the engine and depending on the propellant combination used, more or less pronounced spontaneous combustion instabilities can occur in the combustion chamber. In order to reduce or suppress the oscillations associated therewith, it is known in the prior art to provide, on the one hand, acoustic absorbers and, on the other hand, baffles, which project from the injection head into the combustion chamber and the purpose of which is to divide the combustion chamber into smaller geometric units, in order thus to generate other resonant frequencies. With regard to the use of acoustic absorbers, reference may be made, for example, to DE 10 2004 018 725 B4; with regard to the mounting of baffles, reference may be made, for example, to US 2005/0097883 A1, U.S. Pat. No. 3,200,589 and U.S. Pat. No. 3,342,668.

In the case of such baffles, reliable cooling of the portions of the baffles that face into the combustion chamber, which are in some cases exposed to very high temperatures, is necessary. For this purpose, it is known to use actively cooled baffles. Instead of using baffles, the mentioned combustion oscillations can also be counteracted by mounting some of the injection elements on the injection head in such a manner that they project into the combustion chamber, see U.S. Pat. No. 6,244,041 B1. It must be ensured here that the injection elements in question are arranged as far as possible without gaps, in order to create the desired spatial division of the combustion chamber.

SUMMARY OF THE INVENTION

Against the background of this prior art, the invention provides an injection apparatus for a rocket engine, comprising an injection plate, which delimits a combustion chamber upstream, and a plurality of coaxial injection elements distributed in the injection plate, each of which injection elements forms an inner outlet opening, delimited by a central sleeve body, for a first propellant component and an outer outlet opening for a second propellant component, wherein the outer outlet opening is formed between the central sleeve body and a wall section which encloses the central sleeve body in an annular manner. According to the invention, at least in a partial number of the injection elements, the central sleeve body projects from the wall section in the direction towards the combustion chamber. As a result of the axial (relative to a sleeve axis of the central sleeve body) protrusion of the central sleeve body from the outer outlet opening, an axial staggering of the flame front in the combustion chamber can be achieved. At the same time, the stream of a second propellant component leaving the outer outlet opening can exert a cooling effect on the protruding portion of the central sleeve body. This is beneficial, in particular, when the side of the injection plate that faces the combustion chamber is flat at least in the region of the injection elements and, at least in a partial number of the injection elements, the central sleeve body protrudes from the injection plate on the plate side thereof that faces the combustion chamber. Such a protrusion of the central sleeve body from the injection plate can lead to heterogeneity of the flame front and thus to a reduction of dangerous combustion oscillations.

In some embodiments, in at least a partial number of the injection elements with a central sleeve body that protrudes from the injection plate, the wall section in each case does not protrude relative to the plate side of the plate that faces the combustion chamber. In other words, in these embodiments the outer outlet opening is not displaced into the combustion chamber relative to the surface of the injection plate that faces the combustion chamber.

In some embodiments, in a remaining partial number of the injection elements, the central sleeve body does not protrude relative to the plate side of the injection plate that faces the combustion chamber. In particular, the majority of the injection elements do not protrude in this manner relative to the injection plate. Those injection elements whose central sleeve body protrudes relative to the injection plate can be distributed, when the injection plate is seen from above, on at least one circle or/and at least one radial spoke (radial relative to a plate center of the injection plate), for example. With such an arrangement pattern of the protruding injection elements (that is to say of those injection elements whose central sleeve body protrudes from the injection plate), it is possible to simulate the function of conventional baffles.

BRIEF DESCRIPTION OF THE DRAWINGS

The invention will be explained in greater detail below with reference to the accompanying drawings, in which:

FIGS. 1a and 1b are sectional views of an injection element having an extended central sleeve according to one embodiment, FIG. 1a showing a section along line I-I of FIG. 1b and FIG. 1b showing a section along line II-II of FIG. 1a, FIG. 2 is a sectional view corresponding to the sectional view of FIG. 1a of an injection element with an extended central sleeve according to a further embodiment.

DETAILED DESCRIPTION OF THE PREFERRED EMBODIMENTS

Figure 3:
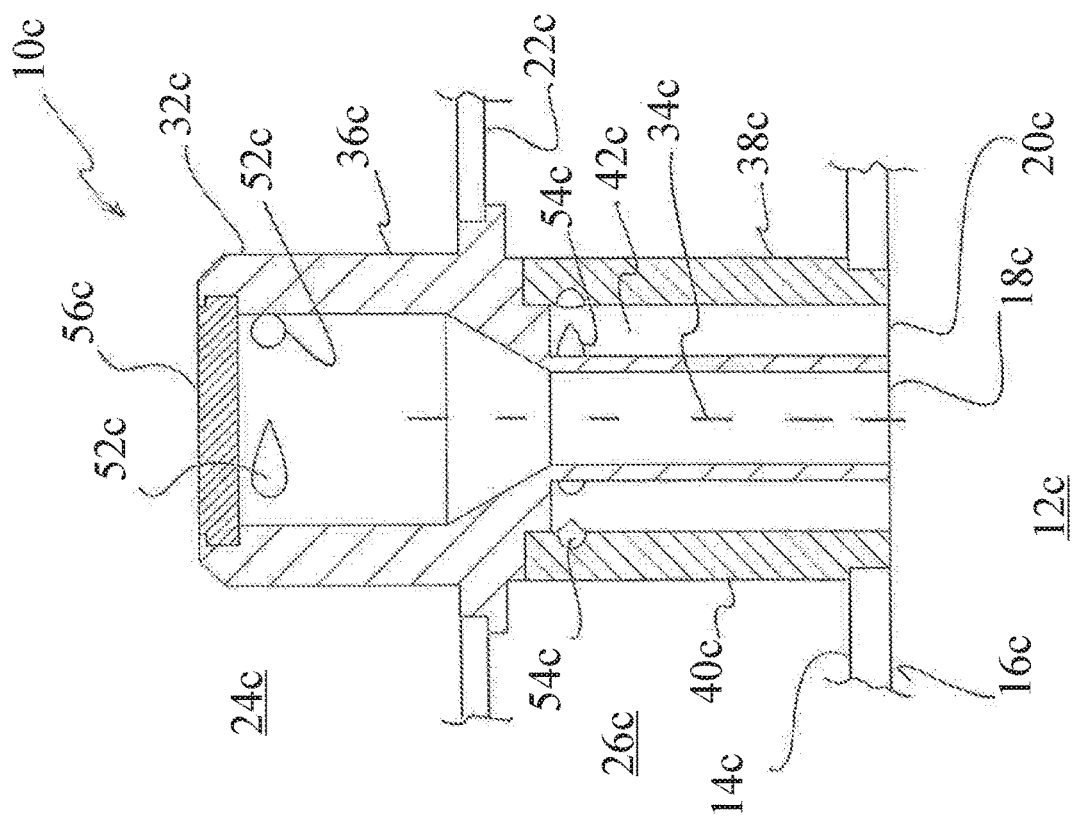
FIGS. 3 and 4 show two embodiments of an injection element without an extended central sleeve.

Reference will first be made to FIGS. 1a and 1b. The injection element shown therein, designated 10, is part of an injection head which serves to inject propellant into a combustion chamber 12 of a rocket engine. The injection element 10 is seated in an injection plate 14 which delimits the combustion chamber 12 upstream and which is equipped with a plurality of (for example, several hundred) propellant injection elements. In the example shown, the injection plate 14 is in the form of a flat plate; the plate side of the injection plate 14 that faces the combustion chamber is designated 16.

The injection element 10 serves to inject two different propellant components into the combustion chamber 12. For this purpose, the injection element 10 has a central (inner) outlet opening 18 through which a first propellant component, for example an oxidant, is injected into the combustion chamber 12. The second propellant component, for example a fuel, is injected into the combustion chamber 12 through an outer outlet opening 20. The outer outlet opening 20 is in the form of an annular opening which, when the injection plate 14 is seen from above from the combustion chamber 12, surrounds the outlet opening 18 in an annular manner. This is referred to as a coaxial configuration of the injection element 10.

When seen from the combustion chamber 12, a separating wall 22, which separates a first feed chamber 24 from a second feed chamber 26, is situated behind the injection plate 14 and spaced apart therefrom. The first propellant component passes from a propellant supply system (not shown) into the first feed chamber 24, where it enters the injection element 10 via a central inlet opening 28. The second propellant component, on the other hand, is guided from the propellant supply system into the second feed chamber 26, where it enters the injection element 10 via a plurality of inlet holes 30 distributed on the periphery of the injection element 10. The central inlet opening 28 is in fluid communication with the central outlet opening 18, and the inlet holes 30 are in fluid communication with the outer outlet opening 20.

The injection element 10 comprises a central sleeve body 32 which defines a sleeve axis 34 and has an axial sleeve portion 36 of larger inside diameter and, axially adjacent thereto, an axial sleeve portion 38 of smaller inside diameter. The injection element 10 further comprises a coaxial sleeve 40 which surrounds the sleeve portion 38 of smaller inside diameter of the central sleeve body 32 and is spaced apart radially therefrom and which is fixedly joined to the central sleeve body 32, typically by welding. Between the coaxial sleeve 40 and the sleeve portion 38 of smaller inside diameter there is formed an annular space 42. The inlet holes 30 are formed in the coaxial sleeve 40 and open into the annular space 42. The coaxial sleeve 40 forms an annular wall section which delimits the outer outlet opening 20 radially outwards.

A ring-shaped slotted body 44, which has a plurality of radial slots 46 distributed in the peripheral direction, is inserted in the annular space 42. The second propellant component flowing into the annular space 42 through the inlet holes 30 is divided by the radial slots 46 into a plurality of strip-like partial streams, which emerge into the combustion chamber 12 at the outer outlet opening 20.

The first propellant component passes from the inlet opening 28 formed at the upstream sleeve end of the central sleeve body 32 through the inside of the sleeve to the central outlet opening 18 formed at the downstream sleeve end. In the sleeve portion 36 of larger inside diameter of the central sleeve body 32 there is inserted a swirl body 48 which has a plurality of swirling grooves 50 distributed in the peripheral direction, each of which swirling grooves runs from one axial end face of the swirl body 48 to the opposite axial end face of the swirl body 48 and experiences an angular offset in the peripheral direction on its path from one axial end face to the other axial end face of the swirl body 48. The first propellant component flowing through the inlet opening 28 into the central sleeve body 32 must flow through the swirling grooves 50 in order to reach the region of the sleeve portion 38 of smaller inside diameter and, from there, the inner outlet opening 18. Because the path of the swirling grooves 50 has a component in the peripheral direction, the first propellant component is swirled as it flows through the swirl body 48.

It will be seen in FIG. 1a that the sleeve portion 38 of smaller inside diameter projects axially by an amount designated I from the plate side 16 of the injection plate 14 that faces the combustion chamber. The coaxial sleeve 40, on the other hand, is flush in the region of its axial end face that faces the combustion chamber with the plate side 16 of the injection plate 14 that faces the combustion chamber. Accordingly, the central outlet opening 18 is displaced axially in the direction towards the combustion chamber 12 relative to the outer outlet opening 20.

In the further figures, components that are the same or have the same effect are provided with the same reference numerals as in FIGS. 1a, 1b, but with the addition of a lower-case letter. Unless indicated otherwise hereinbelow, reference is made to the preceding observations relating to FIGS. 1a, 1b for an explanation of the components in question.

In the injection element 10a according to FIG. 2, swirling of the first propellant component introduced into the central sleeve body 32a and transported therein to the inner outlet opening 18a is effected not by a separate swirl body but by tangential injection of the first propellant component into the interior of the central sleeve body 32a. For this purpose, the sleeve portion 36a of larger inside diameter is designed in the region of the upstream sleeve end with a plurality of tangential holes 52a distributed in the peripheral direction, through which the first propellant component is guided from the feed chamber 24a into the central sleeve body 32a.

A further difference of the injection element 10a, as compared with the embodiment of FIGS. 1a, 1b, is that the second propellant component is also swirled. For this purpose, a plurality of tangential holes 54a, distributed in the peripheral direction, are provided in the coaxial sleeve 40a, through which holes the second propellant component is guided from the feed chamber 26a with a tangential flow component into the annular space 42a. In the case of the injection element 10a, the stream of the second propellant component is not divided into a plurality of partial streams by means of a slotted swirl body (as in the embodiment according to FIGS. 1a, 1b). Instead, the second propellant component is ejected from the outer outlet opening 20a in the form of an annular jet, which is in itself swirled.

For the size of the degree of protrusion I of the central sleeve body 32a relative to the injection plate 14a, the same details as given above in connection with the injection element 10 of FIGS. 1a, 1b apply.

FIG. 3 shows an injection element 10b of the same construction as the injection element 10 of FIGS. 1a, 1b, with the difference that the central sleeve body 32b does not protrude axially relative to the injection plate 14b. Instead, in the example shown, the axial end face of the central sleeve body 32b that faces the combustion chamber is flush with the plate side 16b of the injection plate 14b that faces the combustion chamber. The inner outlet opening 18b and the outer outlet opening 20b accordingly have the same axial position. However, it is possible to set back the central sleeve body 32b axially relative to the plate side 16b of the injection plate 14b that faces the combustion chamber, so that the inner outlet opening 18b would in this case be set back axially from the combustion chamber 12b relative to the outer outlet opening 20b.

Figure 4:
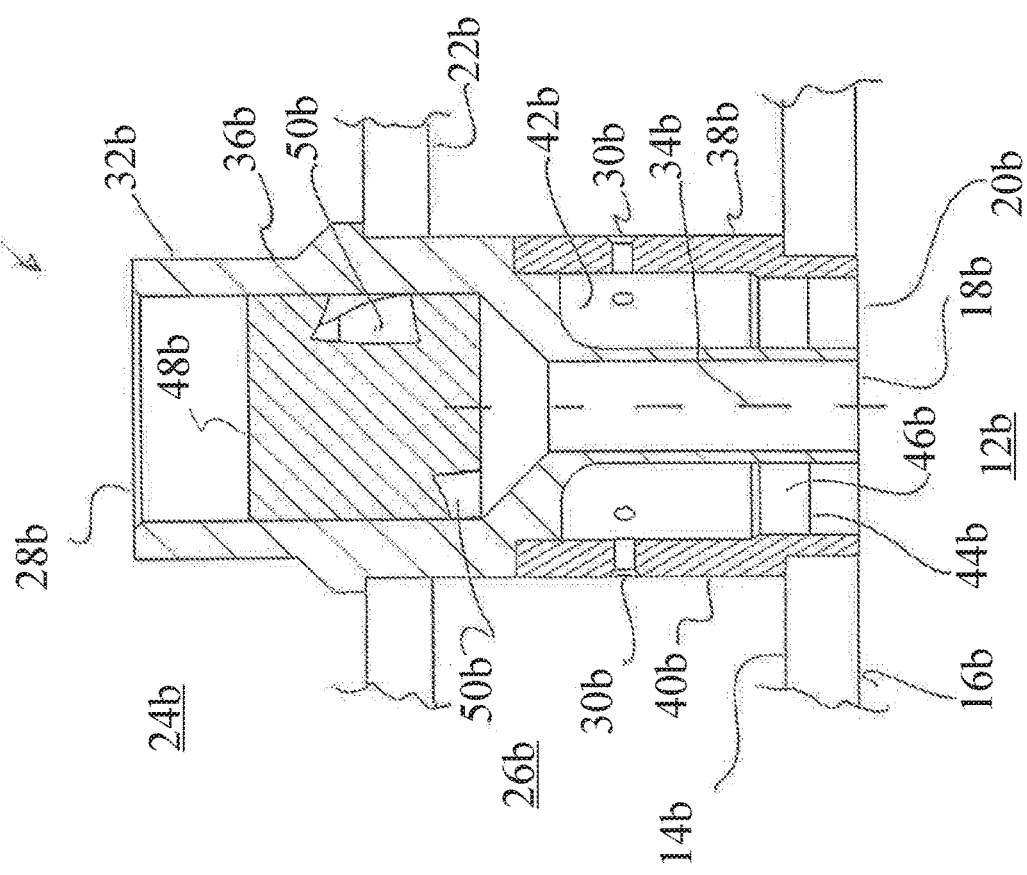
Figure 5A:
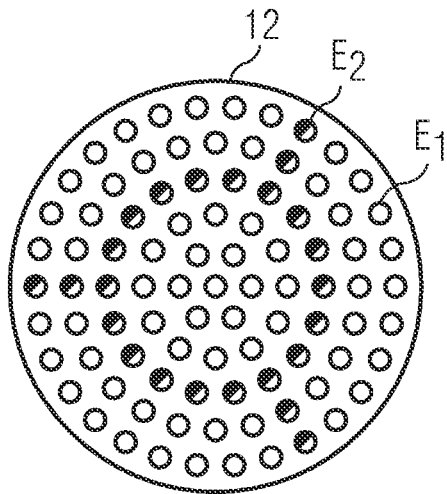
FIGS. 5a to 5d show examples of different distribution patterns of injection elements with an extended central sleeve and injection elements without an extended central sleeve in an injection plate of an injection head of a rocket engine.
Figure 5B:
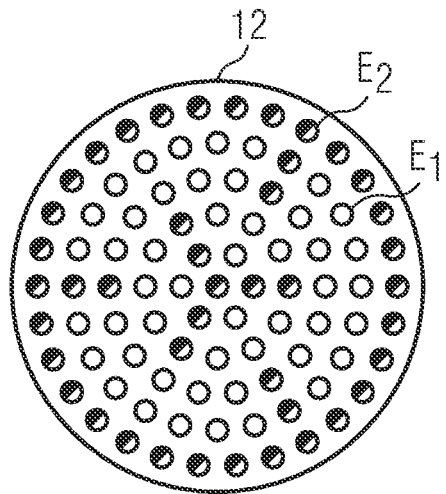
Figure 5C:
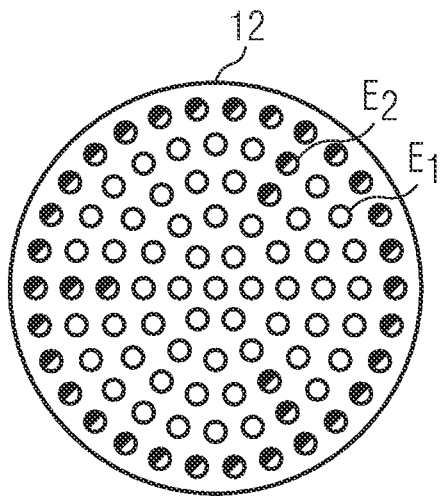
Figure 5D:
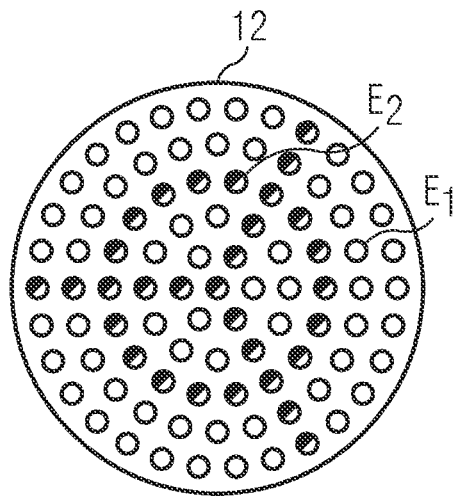

The injection element 10c according to FIG. 4 corresponds to the injection element 10a of FIG. 2 in terms of its construction; however—as in the embodiment according to FIG. 3—the central sleeve body 32c does not protrude axially relative to the plate side 16c of the injection plate 14c that faces the combustion chamber. The axial end face of the central sleeve body 32c that faces the combustion chamber can accordingly either be flush with the plate side 16c of the injection plate 14c that faces the combustion chamber or can be offset axially thereto in the direction away from the combustion chamber 12c.

It should be added that the central sleeve body 32c is closed in the region of its upstream sleeve end by a cover cap 56c. A corresponding cover cap is also provided in the embodiment according to FIG. 2 and is designated 56a therein.

It was mentioned above that the injection plate in an injection head can be equipped with a considerable number of injection elements. Particular embodiments of the invention use injection elements with an extended central sleeve according to the embodiment of FIGS. 1a, 1b or the embodiment of FIG. 2 for a first partial number of the injection elements, and injection elements without an extended central sleeve for a second partial number of the injection elements. For the injection elements without an extended central sleeve, the construction according to FIG. 3 or the construction according to FIG. 4, for example, can be chosen. In particular, the first partial number is smaller than the second partial number, that is to say, the number of injection elements with an extended central sleeve is smaller than the number of injection elements without an extended central sleeve. FIGS. 5a to 5d show examples of arrangement patterns for the distribution of injection elements with an extended central sleeve and injection elements without an extended central sleeve on an injection plate 14. The injection elements without an extended central sleeve are illustrated in the representations of FIGS. 5a to 5d by small circles without a black filling, while the injection elements with an extended central sleeve are illustrated by small circles with a black-colored 180° sector. The injection elements without an extended central sleeve are designated $E_1$ in FIGS. 5a to 5d, while the injection elements with an extended central sleeve are designated $E_2$.

It will be seen that the injection elements $E_2$ (with an extended central sleeve) can be grouped in one or more circles or/and in one or more radial spokes. Radial spoke here refers to an arrangement pattern in which a plurality of injection elements $E_2$ are distributed one behind the other along a line which runs radially—relative to a plate center of the injection plate 14. Such a radial spoke can extend over the entire radial length from the plate center to the plate edge or over only a portion of that length. In particular, the injection elements $E_2$ are grouped in at least one circle which is concentric with the plate center and, in addition, in a plurality of radial spokes which are distributed evenly in the peripheral direction.

With distribution patterns as are shown in FIGS. 5a to 5d it is possible, as with conventional baffles, to achieve a division of the region of the combustion chamber of a rocket engine that is close to the injection head into smaller geometric units. It is essential that injection elements $E_2$ are arranged adjacent to injection elements $E_1$. Because the injection elements $E_2$ project into the combustion chamber only with their central sleeve and the central sleeve is surrounded by the stream of the second propellant component, this stream of the second propellant component protects the portion of the central sleeve that projects into the combustion chamber from the flame heat of adjacent injection elements $E_1$. In the case of the injection elements $E_2$, the stream of the second propellant component accordingly has a cooling action on the portion of the central sleeve that projects into the combustion chamber.

The degree of protrusion of the central sleeve of the injection elements $E_2$ from the injection plate 14 (this degree of protrusion is designated I in each of FIGS. 1a and 2) is specified in dependence on the general position of the flame front and the necessary trimming thereof. In practice, a value of the degree of protrusion I which corresponds to at least approximately the diameter of the outlet opening 18 (in the embodiment of FIGS. 1a, 1b) or of the outlet opening 18a (in the embodiment of FIG. 2) can be used as a starting point. In other words, in particular embodiments, the degree of protrusion I of the injection elements $E_2$ is approximately the inside diameter of the central sleeve in the region of the outlet opening 18, 18a or is greater than that inside diameter. It should be added that the degree of protrusion I can be the same for all the injection elements $E_2$ or can be different for at least some of the injection elements $E_2$.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An injection apparatus for a rocket engine, comprising:
an injection plate delimiting a combustion chamber upstream,
a plurality of coaxial injection elements distributed in the injection plate, each coaxial injection element forming an inner outlet opening, delimited by a central sleeve body, for a first propellant component and an outer outlet opening for a second propellant component, wherein the outer outlet opening is formed between the central sleeve body and a wall section which surrounds the central sleeve body in an annular manner,
wherein in a partial number of the coaxial injection elements, the central sleeve body projects from the wall section in a direction towards the combustion chamber, wherein the central sleeve body comprises a plurality of tangential holes distributed in a peripheral direction, through which the first propellant component enters the central sleeve body, wherein the injection plate is flat on a plate side that faces the combustion chamber, at least in a region of the coaxial injection elements, in which the wall section is flush with the injection plate, and, in the partial number of the coaxial injection elements, the central sleeve body protrudes from the injection plate on the plate side that faces the combustion chamber, and wherein in a remaining partial number of the coaxial injection elements, an axial end face of the central sleeve body that faces the combustion chamber is flush with the plate side of the injection plate that faces the combustion chamber, so that the central sleeve body does not protrude relative to the plate side of the injection plate.

2. The injection apparatus according to claim 1, wherein in at least the partial number of the coaxial injection elements with the protruding central sleeve body, the wall section in each case does not protrude relative to the plate side of the injection plate that faces the combustion chamber.

3. The injection apparatus according to claim 1, wherein the coaxial injection elements with the protruding central sleeve body are distributed, when the injection plate is seen from above, on at least one of at least one circle or at least one radial spoke.

* * * * *